(12) United States Patent
Park

(10) Patent No.: US 9,989,807 B2
(45) Date of Patent: Jun. 5, 2018

(54) LIQUID CRYSTAL DISPLAY

(71) Applicant: SAMSUNG DISPLAY CO., LTD., Yongin, Gyeonggi-do (KR)

(72) Inventor: Haeng Won Park, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 368 days.

(21) Appl. No.: 14/516,809

(22) Filed: Oct. 17, 2014

(65) Prior Publication Data

US 2015/0168794 A1    Jun. 18, 2015

(30) Foreign Application Priority Data

Dec. 18, 2013  (KR) ........................ 10-2013-0158707

(51) Int. Cl.
*G02F 1/1362*  (2006.01)
*G02F 1/1337*  (2006.01)
*G09G 3/36*  (2006.01)
*G02F 1/1343*  (2006.01)

(52) U.S. Cl.
CPC ..... *G02F 1/133707* (2013.01); *G09G 3/3659* (2013.01); *G02F 2001/134345* (2013.01); *G09G 2300/0443* (2013.01); *G09G 2320/0276* (2013.01)

(58) Field of Classification Search
CPC .............................. G02F 1/1362; G02F 1/1343
See application file for complete search history.

(56) References Cited

U.S. PATENT DOCUMENTS

| | | | |
|---|---|---|---|
| 7,567,228 B1 | 7/2009 | Wen et al. | |
| 7,733,314 B2 | 6/2010 | Cho | |
| 7,834,832 B2 | 11/2010 | Ha | |
| 8,144,163 B2 | 3/2012 | Moon | |
| 8,169,391 B2 | 5/2012 | Lee et al. | |
| 8,248,343 B2 | 8/2012 | Huang et al. | |
| 8,299,994 B2 | 10/2012 | Wang et al. | |
| 8,411,003 B2 | 4/2013 | Tsai et al. | |
| 2005/0122295 A1* | 6/2005 | Sawabe | G09G 3/3614 345/88 |
| 2008/0074601 A1 | 3/2008 | Lee et al. | |
| 2009/0310047 A1 | 12/2009 | Shin et al. | |
| 2011/0241979 A1* | 10/2011 | Baek | G09G 3/3614 345/88 |

FOREIGN PATENT DOCUMENTS

KR    1020080046979    5/2008

* cited by examiner

*Primary Examiner* — Tony N Ngo
(74) *Attorney, Agent, or Firm* — F. Chau & Associates, LLC

(57) ABSTRACT

A liquid crystal display includes a plurality of pixels disposed in a matrix shape. Each pixel includes a first subpixel electrode and a second subpixel electrode. Two data lines are positioned between two adjacent pixel columns of the plurality of pixels. First subpixel electrodes in a first pixel row and a second pixel row are connected to a first gate line. Second subpixel electrodes in the second pixel row and a third pixel row are connected to a second gate line. A first data voltage applied to the first subpixel electrodes is higher than a second data voltage applied to the second subpixel electrodes. First duration of a first gate signal applied to the first gate line is shorter than second duration of a second gate signal applied to the second gate line.

22 Claims, 6 Drawing Sheets

LIQUID CRYSTAL DISPLAY

CROSS-REFERENCE TO RELATED APPLICATION

This application claims priority to Korean Patent Application No. 10-2013-0158707 filed in the Korean intellectual Property Office on Dec. 18, 2013, the disclosure of which is incorporated by reference herein in its entirety.

TECHNICAL FIELD

The present invention relates to a liquid crystal display.

DISCUSSION OF THE RELATED ART

To increase side visibility of liquid crystal displays (LCDs), each pixel may be divided into two subpixels which are recharged with different voltages at the same time. In such structure, one subpixel may be insufficiently recharged as compared with the other, thus causing quality deterioration.

SUMMARY

A liquid crystal display according to an exemplary embodiment of the present invention includes a plurality of pixels disposed in a matrix shape. Each of the plurality of pixels includes a first subpixel electrode and a second subpixel electrode. A plurality of gate lines include a first gate line and a second gate line. At least two data lines are positioned between two adjacent pixel columns of the plurality of pixels. The plurality of pixels include a first pixel row, a second pixel row, and a third pixel row adjacent to each other. First subpixel electrodes in the first pixel row and the second pixel row are connected to the first gate line. Second subpixel electrodes in the second pixel row and the third pixel row are connected to the second gate line. A first data voltage applied to the first subpixel electrodes is higher than a magnitude of a second data voltage applied to the second subpixel electrodes. First duration of a first gate signal applied to the first gate line is shorter than second duration of a second gate signal applied to the second gate line.

The first duration may be shorter than 1 horizontal period 1H, and the second duration may be longer than 1 horizontal period 1H.

A sum of the first duration and the second duration may be about 2 horizontal periods 2H.

After the first gate line is applied with the first gate signal, the second gate line may be applied with the second gate signal.

After the second gate line is applied with the second gate signal, the first gate line may be applied with the first gate signal.

The first subpixel electrode and the second subpixel electrode may be connected to the same data line.

A plurality of pixels in a pixel column of the plurality of pixels may be alternately connected to two data lines.

According to an exemplary embodiment of the present invention, a liquid crystal display comprises a pixel including a first subpixel electrode and a second subpixel electrode. A first gate line and a second gate line are adjacent to each other. A first data line and a second data line are adjacent to each other. The first data line and the second data line are positioned adjacent to the pixel. The first subpixel electrode is connected with the first gate line, and the second subpixel electrode is connected with the second gate line. A first data voltage applied to the first subpixel electrode is higher than a second data voltage applied to the second subpixel electrode. A first gate signal is applied to the first gate line for a shorter time than a time when a second gate signal is applied to the second gate line.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
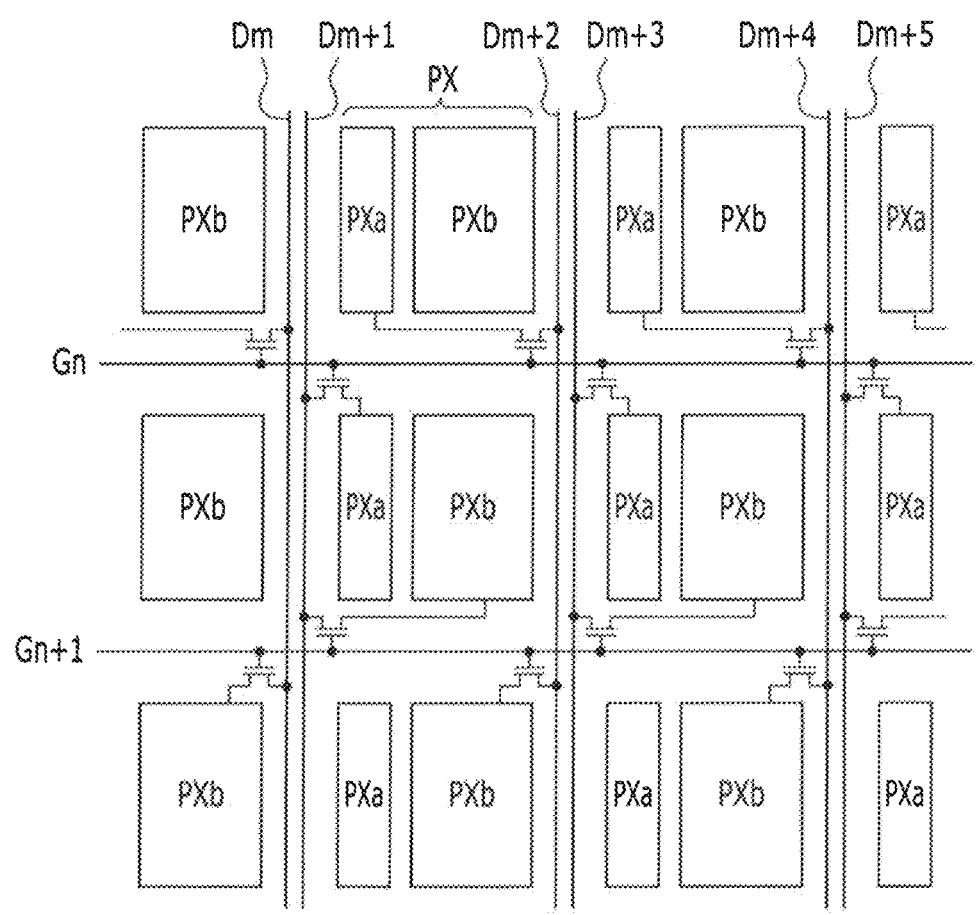
FIG. 1 is a circuit diagram of a liquid crystal display according to an exemplary embodiment of the present invention.

Exemplary embodiments of the present invention will be described in detail hereinafter with reference to the accompanying drawings. Like reference numerals may designate like or similar elements throughout the specification and the drawings. It will be understood that when an element or layer is referred to as being "on," "connected to," "coupled to," or "adjacent to" another element or layer, it can be directly on, connected, coupled, or adjacent to the other element or layer, or intervening elements or layers may be present. As used herein, the singular forms "a," "an," and "the" are intended to include the plural forms as well, unless the context clearly indicates otherwise.

FIG. 1 is a circuit diagram of a liquid crystal display according to an exemplary embodiment of the present invention.

Referring to FIG. 1, a liquid crystal display according to an exemplary embodiment of the present invention includes signal lines including a plurality of gate lines Gn and Gn+1 and a plurality of data lines Dm, Dm+1, Dm+2, Dm+3, Dm+4, and Dm+5 and a plurality of pixels PX, each including a first subpixel electrode PXa and a second subpixel electrode PXb. The plurality of pixels PX are connected to the signal lines and arranged in an approximate matrix.

The plurality of gate lines Gn and Gn+1 include a first gate line Gn and a second gate line Gn+1 that are positioned one over another.

The plurality of data lines Dm, Dm+1, Dm+2, Dm+3, Dm+4, and Dm+5 include a first data line Dm and a second data line Dm+1 adjacent to each other, a third data line Dm+2 and a fourth data line Dm+3 adjacent to each other, and a fifth data line Dm+4 and a sixth data line Dm+5 adjacent to each other.

A pair of the data lines Dm and Dm+1, a pair of the data lines Dm+2 and Dm+3, and a pair of the data lines Dm+4 and Dm+5 are each disposed between two adjacent pixel columns.

The first subpixel electrodes PXa positioned in a first pixel row and the first subpixel electrodes PXa positioned in a second pixel row are connected to the first gate line Gn. The second subpixel electrodes PXb in the second pixel row and the second subpixel electrodes PXb in a third pixel row are connected to the second gate line Gn+1.

The first subpixel electrode PXa and the second subpixel electrode PXb of each pixel PX are connected to the same data line, and the pixels PX adjacent to each other in the same pixel column are alternately connected to two data lines, e.g., Dm+1 and Dm+2 or Dm+3 and Dm+4, positioned at both sides thereof.

A data voltage applied to the first subpixel electrode PXa is higher than the data voltage applied to the second subpixel electrode PXb.

Figure 2:
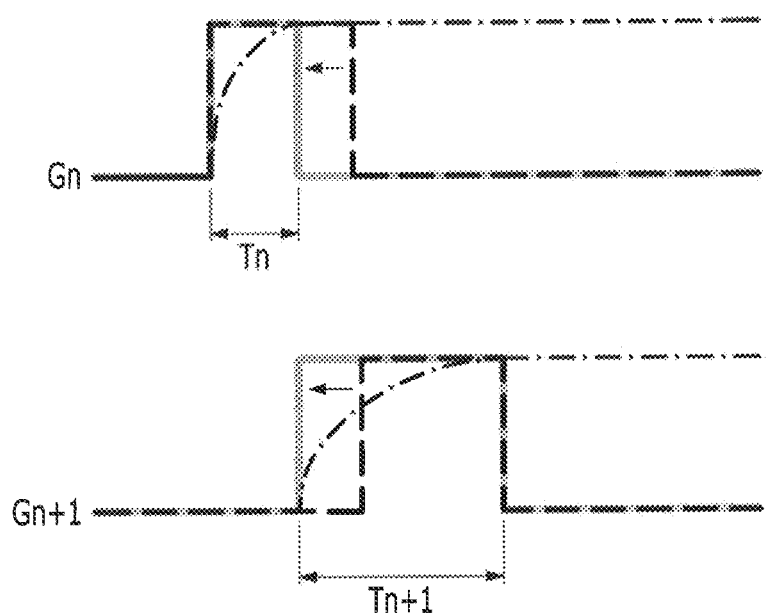
FIG. 2 is a waveform diagram of a signal applied to a liquid crystal display according to an exemplary embodiment of the present invention.

FIG. 2 is a waveform diagram of a signal applied to a liquid crystal display according to an exemplary embodiment of the present invention.

Referring to FIG. 2, when a first gate signal is applied to the first gate line Gn, the first subpixel electrodes PXa connected to the first gate line Gn are applied with a first data voltage that is relatively high in magnitude.

When the first gate signal applied to the first gate line Gn is changed from a gate-on signal to a gate-off signal, a second gate signal is applied to the second gate line Gn+1. When the second gate signal is applied to the second gate line Gn+1, the second subpixel electrodes PXb connected to the second gate line Gn+1 are applied with a second data voltage that is relatively low in magnitude.

The duration Tn of the first gate signal is shorter than the duration Tn+1 of the second gate signal.

The duration Tn of the first gate signal is shorter than a horizontal period 1H, the duration Tn+1 of the second gate signal is longer than the horizontal period 1H, and a sum of the duration Tn and the duration Tn+1 is substantially the same as 2 horizontal periods 2H.

The duration of the first gate signal, during which the first data voltage that is relatively high in magnitude is applied, is relatively short, and the duration of the second gate signal, during which the second data voltage that is relatively low in magnitude is applied, is relatively long.

The first data voltage of a relatively larger magnitude is charged to the first subpixel electrodes PXa during the duration Tn that is relatively short, and the second data voltage of a relatively smaller magnitude is charged to the second subpixel electrode PXb during the duration Tn+1 that is relatively long. Accordingly, the first and second subpixel electrodes PXa and PXb both may be electrically charged with sufficient data voltage.

Therefore, although the first gate signal and the second gate signal do not overlap each other, the first subpixel electrode PXa applied with the first data voltage of a relatively larger magnitude and the second subpixel electrode PXb applied with the second data voltage of a relatively lower magnitude may both be charged with enough voltage.

Since the first subpixel electrodes PXa positioned in two adjacent pixel rows may be connected to the same gate line and the second subpixel electrodes PXb positioned in two adjacent pixel rows may be connected to the same gate line, the first data voltage and the second data voltage may be simultaneously applied to the first subpixel electrodes PXa or the second subpixel electrodes PXb. Accordingly, even when the resolution of the liquid crystal display increases therefore requiring high speed driving, the plurality of pixels PX may be driven without signal delay.

The first subpixel electrode PXa and the second subpixel electrode PXb in a pixel PX may be applied with a first data voltage and a second data voltage different in magnitude from the first data voltage. For example, the first data voltage and the second data voltage may be determined so that a combination gamma curve of the first data voltage and the second data voltage is close to a reference gamma curve when the display is viewed from the front.

Figure 3:
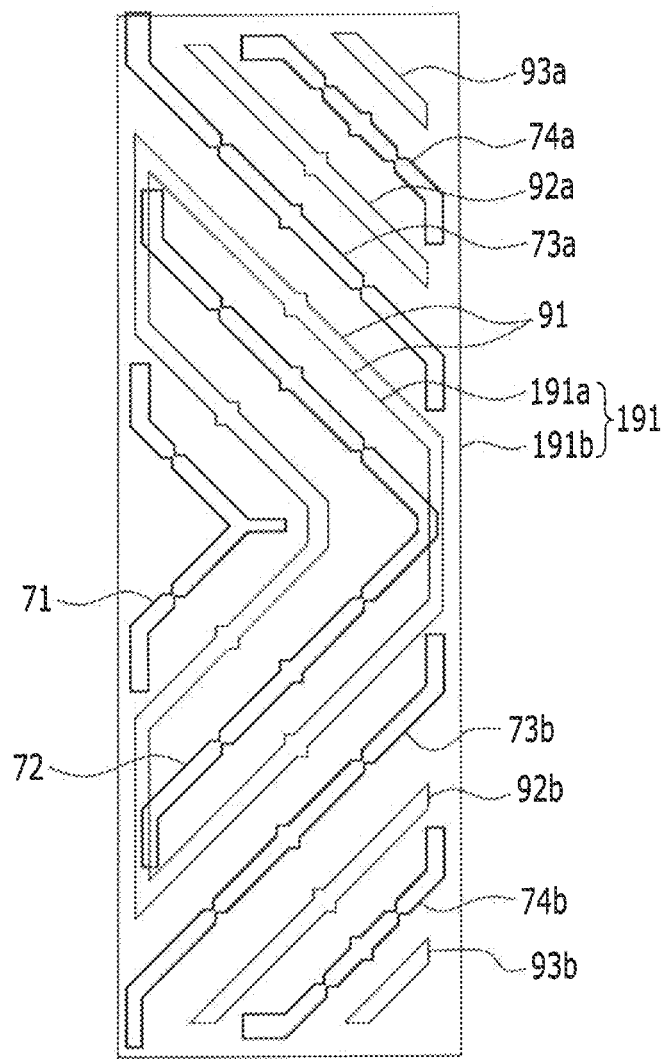
FIG. 3 is a layout view of a portion of a liquid crystal display according to an exemplary embodiment of the present invention.

FIG. 3 is a layout view of a portion of a liquid crystal display according to an exemplary embodiment of the present invention.

A pixel electrode 191 of the liquid crystal display according to an exemplary embodiment of the present invention includes a first subpixel electrode 191a and a second subpixel electrode 191b that are spaced apart from each other by a gap 91. The first subpixel electrode 191a is positioned in a middle portion of the second subpixel electrode 191b. For example, the second subpixel electrode 191b encloses the first subpixel electrode 191a and is separated from the first subpixel electrode 191a by the gap 91, leaving the second subpixel electrode 191b not to overlap the first subpixel electrode 191a.

The second subpixel electrode 191b has upper cutouts 92a and 93a and lower cutouts 92b and 93b. The second subpixel electrode 191b is divided into a plurality of regions by the cutouts 92a, 92b, 93a, and 93b. The upper cutouts 92a and 93a are symmetrical with the lower cutouts 92b and 93b with respect to an imaginary horizontal line (not shown).

The upper and lower cutouts 92a, 92b, 93a, and 93b obliquely extend from a right edge of the pixel electrode 191 to a left, upper, or lower edge of the pixel electrode 191. The upper cutouts 92a and 93a are disposed in an upper half of the pixel with respect to the imaginary horizontal line, and the lower cutouts 92b and 93b are disposed in a lower half of the pixel with respect to the imaginary horizontal line. The upper cutouts 92a and 93a and the lower cutouts 92b and 93b are inclined by about 45° with respect to a gate line (not shown). The upper cutouts 92a and 93a may be substantially perpendicularly to the lower cutouts 92b and 93b.

Accordingly, the lower half of the pixel electrode 191 is divided into four regions by the gaps 91 and the lower cutouts 92b and 93b, and the upper half of the pixel electrode 191 is divided into four regions by the gaps 91 and the upper cutouts 92a and 93a. The number of the regions or cutouts may vary depending on, e.g., the size of the pixel electrode 191, the length ratio of the horizontal side and the vertical side of the pixel electrode 191, the type of liquid crystal layer, or other characteristics.

The cutouts 92a, 921b, 93a, and 93b include triangular notches. The notches may be quadrangular, trapezoidal, or semicircular in shape, and may have convex or concave shapes. The cutouts 92a, 92b, 93a, and 93b may determine the arrangement direction of liquid crystal molecules in their corresponding regions of the liquid display panel.

A common electrode faces the pixel electrode 191. The common electrode includes a plurality of cutouts 71, 72, 73a, 73b, 74a, and 74b.

The cutouts 71, 72, 73a, 73b, 74a, and 74b face the pixel electrode 191. The cutouts 71, 72, 73a, 73b, 74a, and 74b include first and second central cutouts 71 and 72, upper cutouts 73a and 74a, and lower cutouts 73b and 74b. Each of the cutouts 71, 72, 73a, 73b, 74a, and 74l is disposed between its adjacent ones of the cutouts 92a, 93a, 92b, and 93l of the pixel electrode 191. Each of the cutouts 71, 72, 73a, 73b, 74a, and 74b includes at least one oblique branch parallel to the upper cutouts 93b and 94b or the lower cutouts 93a and 94a of the pixel electrode 191.

The upper and lower cutouts 73a, 74a, 73b, and 74b each include an oblique branch, a horizontal branch, and a vertical branch. The oblique branch substantially extends from a right edge of the pixel electrode 191 to a left, upper, or lower edge of the pixel electrode 191 and is positioned parallel to the upper cutouts 92a and 93a or the lower cutouts 92b and 93b of the pixel electrode 191. The horizontal branch and the vertical branch extend from ends of the oblique branch, overlap the edge of the pixel electrode 191, and form an obtuse angle with the oblique branch.

The first and second central cutouts 71 and 72 include a central horizontal branch, a pair of oblique branches, and a pair of end vertical branches. The central horizontal branch extends from the right edge of the pixel electrode 191 to the left side substantially in parallel with a horizontal central line of the pixel electrode 191. The pair of oblique branches extends from the central transverse branch toward the left edge of the pixel electrode 191. The oblique branches are substantially parallel to the upper and lower cutouts 73a, 73b, 74a, and 74b. The end vertical branches extend from ends of the oblique branches, overlap the left edge of the pixel electrode 191, and form an obtuse angle with the oblique branch.

The oblique portions of the cutouts 71, 72, 73a, 73b, 74a include triangular notches. The notches may be quadrangular, trapezoidal, or semicircular in shape.

The number and direction of the cutouts 71, 72, 73a, 73b, 74a may be changed according to design elements.

One pixel area may be divided into a plurality of sub-regions, allowing for a wide viewing angle of the liquid crystal display.

The second subpixel electrode 191b may be larger in area than the first subpixel electrode 191a.

Figure 4:
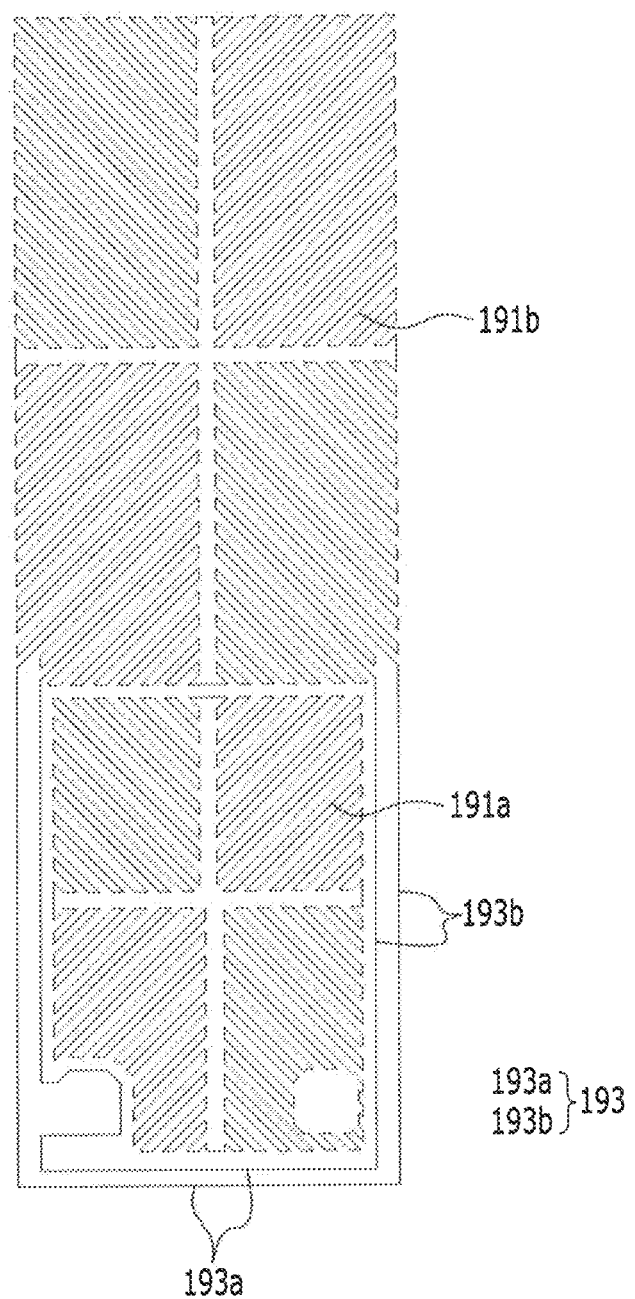
FIG. 4 is a layout view of a portion of a liquid crystal display according to an exemplary embodiment of the present invention.

FIG. 4 is a layout view of a portion of a liquid crystal display according to an exemplary embodiment of the present invention.

Referring to FIG. 4, each pixel electrode of the liquid crystal display according to an exemplary embodiment of the present invention includes a first subpixel electrode 191a and a second subpixel electrode 191b separated from each other by a gap 91.

The overall shape of the first and second subpixel electrodes 191a and 191b is quadrangular. The first and second subpixel electrodes 191a and 191b include horizontal stems and vertical stems that cross the horizontal stems. Each of the first subpixel electrode 191a and the second subpixel electrode 191b is divided into four sub-regions by a horizontal stem and a longitudinal stem, and each of the sub-regions includes a plurality of narrow branches.

The second subpixel electrode 191b encloses the first subpixel electrode 191a. The second sub-pixel electrode 191b includes a connection portion 193. The connection portion 193 is connected with narrow branches and surrounds three sides of the first sub-pixel electrode 191a. The connection portion 193 is shaped like the letter "U." The connection portion 193 includes a first portion 193a parallel with a gate line (not shown) and two second portions 193b parallel with data lines (not shown). The first portion 193a and the two second portions 193b are connected to each other and surround three sides of the first sub-pixel electrode 191a.

Some of the narrow branches of the first sub-pixel electrode 191a and the second sub-pixel electrode 191b obliquely extend in an upper and left direction from the horizontal stems or the vertical stems, and other narrow branches obliquely extends in a upper and right direction from the horizontal stems or the vertical stems. Some of the narrow branches extend in a lower and left direction from the horizontal stems or the vertical stems, and other narrow branches obliquely extend in a lower and right direction from the horizontal stems or the vertical stems.

The second subpixel electrode 191b may be larger in area than the first subpixel electrode 191a.

Figure 5:
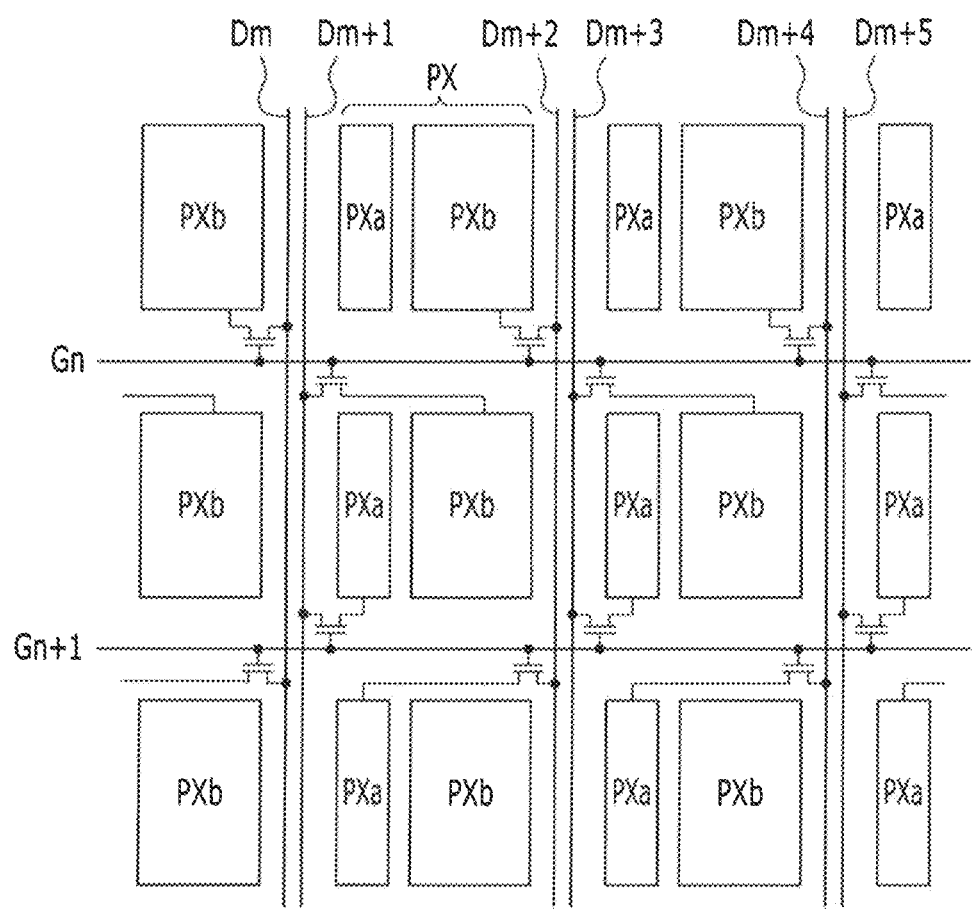
FIG. 5 is a circuit diagram of a liquid crystal display according to an exemplary embodiment of the present invention.

FIG. 5 is a circuit diagram of a liquid crystal display according to an exemplary embodiment of the present invention.

Referring to FIG. 5, a liquid crystal display according to an exemplary embodiment of the present invention includes signal lines including a plurality of gate lines Gn and Gn+1 and a plurality of data lines Dm, Dm+1, Dm+2, Dm+4, and Dm+5 and a plurality of pixels PX each including a first subpixel electrode PXa and a second subpixel electrode PXb. The plurality of pixels PX are connected to the signal lines and are arranged in an approximate matrix.

A plurality of gate lines Gn and Gn+1 include a first gate line Gn and a second gate line Gn+1 that are positioned one over another.

The plurality of data lines Dm, Dm+1, Dm+2, Dm+3, Dm+4, and Dm+5 include a first data line Dm and a second data line Dm+1 adjacent to each other, a third data line Dm+2 and a fourth data line Dm+3 adjacent to each other, and a fifth data line Dm+4 and a sixth data line Dm+5 adjacent to each other.

A pair of data lines Dm and Dm+1, a pair of data lines Dm+2 and Dm+3, a pair of data lines Dm+4 and Dm+5 are each disposed between two adjacent pixel columns.

The second subpixel electrodes PXb positioned in a first pixel row and the second subpixel electrodes PXb positioned in a second pixel row are connected to the first gate line Gn. The first subpixel electrodes PXa positioned in the second pixel row and the first subpixel electrodes PXa positioned in a third pixel row are connected to the second gate line Gn+1.

The first subpixel electrode PXa and the second subpixel electrode PXb of each pixel PX are connected to the same data line, and the pixels PX adjacent to each other in the same pixel column are alternately connected to two data lines, e.g., Dm+1 and Dm+2, or Dm+3 and Dm+4, positioned at both sides thereof.

A data voltage applied to the first subpixel electrode PXa is higher than the data voltage applied to the second subpixel electrode PXb.

Figure 6:
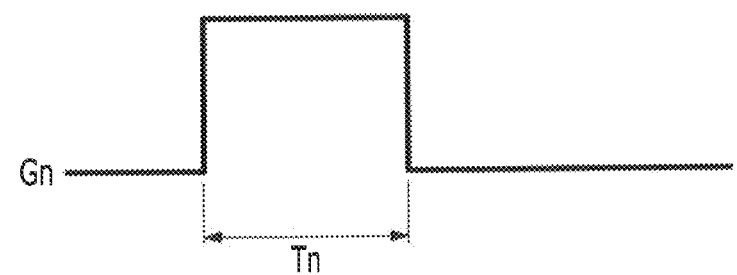
FIG. 6 is a waveform diagram of a signal applied to a liquid crystal display according to an exemplary embodiment of the present invention.
Figure 6:
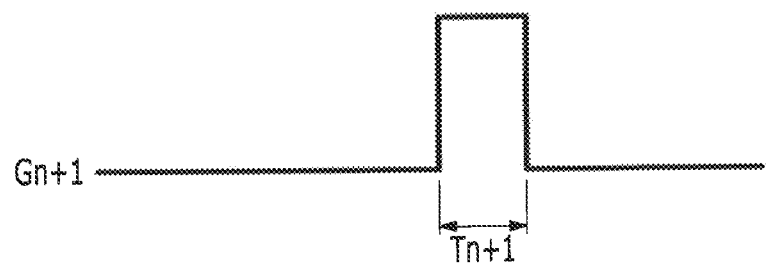

FIG. 6 is a waveform diagram of a signal applied to a liquid crystal display according to an exemplary embodiment of the present invention.

When a first gate signal is applied to the first gate line Gn, the second subpixel electrodes PXb connected with the first gate line Gn are applied with a second data voltage of a relatively smaller magnitude.

When the first gate signal applied to the first gate line Gn is changed from a gate-on signal to a gate-off signal, a second gate signal is applied to the second gate line Gn+1. When the second gate signal is applied to the second gate line Gn+1, the first subpixel electrodes PXa connected to the second gate line Gn+1 are applied with a first data voltage of a relatively larger magnitude.

The duration Tn of the first gate signal is longer than the duration Tn+1 of the second gate signal.

The duration Tn of the first gate signal is longer than a horizontal period 1H, the duration Tn+1 of the second gate signal is shorter than the horizontal period 1H, and a sum of the first time duration Tn and the second time duration Tn+1 is substantially the same as 2 horizontal sections 2H.

The duration of the first gate signal, during which the second data voltage of a relatively smaller magnitude is applied, is relatively long, and the duration of the second gate signal, during which the first data voltage of a relatively larger magnitude is applied, is relatively short.

The second data voltage of the relatively smaller magnitude is charged to the second subpixel electrode PXb during the duration Tn that is relatively longer, and the first data voltage of the relatively larger magnitude is charged to the first subpixel electrode PXa during the duration Tn+1 that is relatively shorter. Accordingly, the first and second subpixel electrodes PXa and PXb both may be electrically charged with sufficient voltage.

Therefore, although the first gate signal and the second gate signal do not overlap each other, the first subpixel electrode PXa applied with the first data voltage of the relatively larger magnitude and the second subpixel electrode PXb applied with the second data voltage of the relatively lower magnitude may both be electrically charged with sufficient voltage.

Since the first subpixel electrodes PXa positioned in two adjacent pixel rows may be connected to the same gate line and the second subpixel electrodes PXb positioned in two adjacent pixel rows may be connected to the same gate line, the first data voltage and the second data voltage are simultaneously applied to the first subpixel electrodes PXa or the second subpixel electrodes PXb. Accordingly, even when the resolution of the liquid crystal display increases therefore requiring higher speed driving, the plurality of pixels PX may be driven without signal delay.

The first subpixel electrode PXa and the second subpixel electrode PXb in a pixel PX may be applied with a first data voltage and a second data voltage different in magnitude from the first data voltage. For example, the first data voltage and the second data voltage may be determined so that a combination gamma curve of the first data voltage and the second data voltage is close to a reference gamma curve when the display is viewed from the front.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A liquid crystal display, comprising:
   a plurality of pixels disposed in a matrix shape, wherein the plurality of pixel is arranged in a plurality of pixel columns and a plurality of pixel rows,
   each of the plurality of pixels including a first subpixel electrode and a second subpixel electrode, the first subpixel electrode having a first area and the second subpixel electrode having a second area, and the second area being greater than the first area;
   a plurality of gate lines including a first gate line and a second gate line; and
   at least two data lines positioned between two adjacent pixel columns of the plurality of pixel columns,
   wherein the plurality of pixel rows includes a first pixel row, a second pixel row, and a third pixel row adjacent to each other,
   wherein first subpixel electrodes in the first pixel row and first subpixel electrodes in the second pixel row are connected to the first gate line,
   wherein second subpixel electrodes in the second pixel row and second subpixel electrodes in the third pixel row are connected to the second gate line,
   wherein the first gate line is connected to the first subpixel electrodes having the first area corresponding to the adjacent pixel rows and the second gate line is connected to the second subpixel electrodes having the second area corresponding to two adjacent pixel rows,
   wherein the first subpixel electrode is supplied with a first data voltage and the second subpixel electrode is supplied with a second data voltage, a difference between a common voltage and the first data voltage is greater than a difference between the common voltage and the second data voltage at a specific gray level, and
   wherein the first gate line is not directly connected to the second subpixel electrodes in the first pixel row and the second pixel row, and the second gate line is not directly connected to the first subpixel electrodes in the first pixel row and the second pixel row.

2. The liquid crystal display of claim 1,
   wherein a first duration of a first gate signal applied to the first gate line is shorter than a second duration of a second gate signal applied to the second gate line.

3. The liquid crystal display of claim 2,
   wherein the first duration is shorter than one horizontal period, and the second duration is longer than the one horizontal period.

4. The liquid crystal display of claim 3,
   wherein a sum of the first duration and the second duration is about 2 horizontal periods.

5. The liquid crystal display of claim 4,
   wherein, after the first gate line is applied with the first gate signal, the second gate line is applied with the second gate signal.

6. The liquid crystal display of claim 5,
   wherein the first subpixel electrode and the second subpixel electrode are connected to the same data line of the at least two data lines.

7. The liquid crystal display of claim 6,
   wherein pixels in a pixel column of the plurality of pixel columns are alternately connected to the at least two data lines.

8. The liquid crystal display of claim 4,
   wherein after the second gate line is applied with the second gate signal, the first gate line is applied with the first gate signal.

9. The liquid crystal display of claim 8,
   wherein the first subpixel electrode and the second subpixel electrode are connected to the same data line of the at least two data lines.

10. The liquid crystal display of claim 9,
    wherein pixels in a pixel column of the plurality of pixel columns are alternately connected to the at least two data lines.

11. The liquid crystal display of claim 2,
    wherein after the first gate line is applied with the first gate signal, the second gate line is applied with the second gate signal.

12. The liquid crystal display of claim 11,
wherein the first subpixel electrode and the second subpixel electrode are connected to the same data line of the at least two data lines.

13. The liquid crystal display of claim 12,
wherein pixels in a pixel column of the plurality of pixel columns are alternately connected to the at least two data lines.

14. The liquid crystal display of claim 2,
wherein after the second gate line is applied with the second gate signal, the first gate line is applied with the first gate signal.

15. The liquid crystal display of claim 14,
wherein the first subpixel electrode and the second subpixel electrode are connected to the same data line of the at least two data lines.

16. The liquid crystal display of claim 15,
wherein pixels in a pixel column of the plurality of pixel columns are alternately connected to two data lines of the at least two data lines.

17. A liquid crystal display, comprising:
a pixel including a first subpixel electrode and a second subpixel electrode, the first subpixel electrode having a first area and the second subpixel electrode having a second area, and the second area being greater than the first area;
a first gate line and a second gate line adjacent to the first gate line; and
a first data line and a second data line adjacent to the first data line, the pixel disposed between the first data line and the second data line,
wherein the first subpixel electrode is connected with the first gate line,
wherein the second subpixel electrode is connected with the second gate line,
wherein the first subpixel electrode and the second subpixel electrode of the pixel are connected to the first data line,
wherein the first data line applies a first data voltage to the first subpixel electrode of the pixel and the first data line applies a second data voltage to the second subpixel electrode of the pixel,
wherein a difference between a common voltage and the first data voltage is greater than a difference between the common voltage and the second data voltage at a specific gray level, and
wherein a first gate signal is applied to the first gate line for a shorter time than a time when a second gate signal is applied to the second gate line.

18. The liquid crystal display of claim 17,
wherein the pixel is interposed between the first gate line and the second gate line.

19. A liquid crystal display, comprising:
a first gate line extending in a first direction;
a second gate line adjacent to the first gate line;
a pair of first data lines extending in a second direction in parallel to the first direction;
a pair of second data lines adjacent to the first pair of data lines; and
a first pixel interposed between the first gate line and the second gate line and between the pair of the first data lines and the pair of the second data lines,
wherein the first pixel includes a first subpixel electrode and a second subpixel electrode,
wherein the first pixel is connected to the first gate line and the second gate line,
wherein the first pixel is connected to one of the pair of the first data lines,
wherein the one of the pair of the first data lines applies a first data voltage to the first subpixel electrode and a second data voltage to the second subpixel electrode, and
wherein a difference between a common voltage and the first data voltage is greater than a difference between the common voltage and the second data voltage at a specific gray level.

20. The liquid crystal display of claim 19, further comprising:
a second pixel interposed between the first gate line and the second gate line and adjacent to the first pixel along the first direction,
wherein the second pixel is connected to the first gate line and the second gate line, and
wherein the second pixel is connected to one of the pair of the second data lines.

21. The liquid crystal display of claim 19,
wherein the first subpixel electrode is connected to the first gate line, and
wherein the second subpixel electrode is connected to the second gate line.

22. The liquid crystal display of claim 19, further comprising:
a third pixel electrode adjacent to the first pixel along the second direction,
wherein the third pixel electrode is connected to the second gate line and the one of the pair of the first data lines.

* * * * *